(No Model.)
R. R. DARLING.
FILTER.
No. 457,630. Patented Aug. 11, 1891.
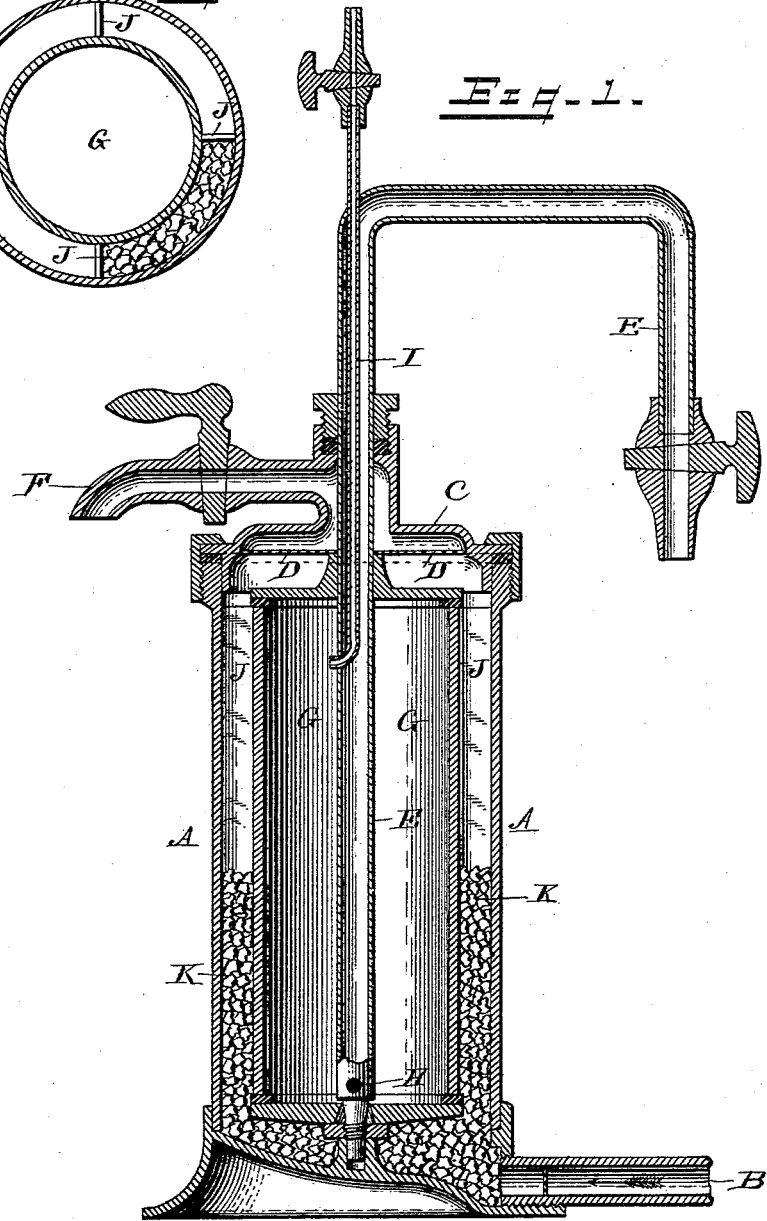
WITNESSES:
Albert B. Blackwood
Jas H Blackwood
INVENTOR
Rolla R. Darling
BY
W. H. Ruff
ATTORNEY.

UNITED STATES PATENT OFFICE.

ROLLA R. DARLING, OF CLEVELAND, OHIO.

FILTER.

SPECIFICATION forming part of Letters Patent No. 457,630, dated August 11, 1891.

Application filed April 2, 1891. Serial No. 387,357. (No model.)

*To all whom it may concern:*

Be it known that I, ROLLA R. DARLING, of Cleveland, in the county of Cuyahoga and State of Ohio, have invented certain new and useful Improvements in Filters; and I do hereby declare the following to be a full, clear, and exact description of the invention, such as will enable others skilled in the art to which it appertains to make and use the same.

The object of my invention is to provide an improved means of cleaning the surfaces of filtering plates or cylinders; and it consists, essentially, in an improved construction whereby I am enabled to revolve the filtering-plate or other device against a loose abrading substance held stationary, or vice versa, so as to thoroughly remove all impurities from the surface to be cleaned.

A further object of the invention is to improve the construction of the filter, all of which will be hereinafter fully described, and then pointed out in the claims.

The accompanying drawings fully illustrate my invention, and in the said drawings Figure 1 is a vertical longitudinal section of a filter provided with my improvement, and Fig. 2 is a horizontal section of the same.

Referring to the drawings more specifically by letter, A designates the casing or outer cylinder, which may be supported in any suitable manner upon a table or other device, and which is provided with an inlet-pipe B at its lower end, through which the water enters the filter. The upper end of the casing is closed by a cap C, in which a strainer D is arranged, and the discharge-pipe E passes vertically through the center of the cap. The cap is further provided with a faucet F, through which the waste may be drawn off when it is desired to clean the filter.

Concentrically within the casing I provide a filtering-cylinder G, which is composed of some filtering porous substance, and is provided with impervious heads fitted to its porous body by water-tight joints. The discharge-pipe E terminates near the bottom of the filtering-cylinder and is provided at its lower end with an opening or perforation H, through which the filtered water passes as it is drawn off for use. A small air-tube I is provided within the discharge-pipe, as clearly shown, to permit the filtering-cylinder to be charged with air, which is compressed when the filter is in operation. When the faucet in the discharge-pipe is opened, the expansion of the air expels the filtered contents of the cylinder.

The construction thus far described relates solely to the filter; but it will be readily understood that my improved means of cleaning is not confined thereto, but is applicable to any filter that employs a porous filtering cylinder or plate.

Between the casing of the filter and the filtering-plate I arrange one or more partitions J, which may be formed integral with the casing or separate therefrom, as preferred, and may be of any suitable material, rubber being preferred on account of its cheapness and durability. These partitions may be formed by corrugating the inner surface of the casing so that the ribs will project inward to the filtering-plate, or they may be formed of independent plates or bars, slipped downward between the casing and the filtering-plate.

In the space between the casing and the filtering-plate and entirely filling the same I provide a quantity of abrading material K, such as broken glass, sand, or similar substances.

In practice the filter will be used in the usual manner to purify the water, and when it is desired to clean the filtering-plate and rid it of the impurities accumulated upon its surface the faucet F is opened, while either the casing or the filtering-plate is rotated by any suitable mechanism. When the cylinder is rotated, its surface will be caused to travel against and over the abrading material, and the impurities will consequently be removed. It will be seen at once that the transverse partitions between the casing and the filtering-plate prevent the abrading material from adhering to and being made to follow the surface of the filtering-plate as it revolves, and consequently the said material will act positively and effectively upon the accumulation of impurities and remove the same from the surface of the plate. Were these partitions omitted the abrading material would be drawn to the filtering-plate and rotate with it, and would consequently have no effect thereon. Of course the result would be the same were the casing revolved and the filtering-plate held stationary, and such a method of operating the device is entirely within the scope of my invention. It will also be understood that the mechanism for rotating the casing or the cylinder is immaterial, and may be of any preferred or convenient form.

By utilizing my invention the filtering-plate may be entirely rid of all impurities in a very short time and with very little labor.

Having thus described my invention, what I claim, and desire to secure by Letters Patent, is—

1. The combination of the casing, the filtering-cylinder arranged concentrically therein, the filling of abrading material arranged between the casing and the cylinder, and the partitions arranged within said material and extending between the casing and the cylinder, whereby when the cylinder is revolved the abrading material will be held stationary.

2. The combination of the casing, the cap secured thereto and provided with a faucet F, the filtering-cylinder within the casing, the discharge-pipe leading upward through the said cylinder, and the air-tube leading downward into the cylinder and terminating near the upper end of the same.

In testimony whereof I have signed this specification in the presence of two subscribing witnesses.

ROLLA R. DARLING.

Witnesses:
LEVI F. BAUDER,
W. H. HUDSON.